US010755498B2

(12) United States Patent
Yasuda

(10) Patent No.: US 10,755,498 B2
(45) Date of Patent: Aug. 25, 2020

(54) DRIVE RECORDER

(71) Applicant: PAI-R Co., Ltd., Osaka (JP)

(72) Inventor: Isao Yasuda, Osaka (JP)

(73) Assignee: PAI-R Co., Ltd., Osaka (JP)

( * ) Notice: Subject to any disclaimer, the term of this patent is extended or adjusted under 35 U.S.C. 154(b) by 307 days.

(21) Appl. No.: 15/567,947

(22) PCT Filed: Mar. 29, 2016

(86) PCT No.: PCT/JP2016/060045
§ 371 (c)(1),
(2) Date: Oct. 19, 2017

(87) PCT Pub. No.: WO2016/170934
PCT Pub. Date: Oct. 27, 2016

(65) Prior Publication Data
US 2018/0137698 A1 May 17, 2018

(30) Foreign Application Priority Data
Apr. 24, 2015 (JP) .................................. 2015-089224

(51) Int. Cl.
*G07C 5/08* (2006.01)
*G08G 1/00* (2006.01)
(Continued)

(52) U.S. Cl.
CPC ............ *G07C 5/0866* (2013.01); *B60R 11/04* (2013.01); *B60R 21/00* (2013.01); *G07C 5/008* (2013.01);
(Continued)

(58) Field of Classification Search
None
See application file for complete search history.

(56) References Cited

U.S. PATENT DOCUMENTS 5,797,134 A * 8/1998 McMillan .......... G06Q 30/0283
705/400
6,012,012 A * 1/2000 Fleck .................. G08G 1/0104
340/905

(Continued)

FOREIGN PATENT DOCUMENTS

GB 2486384 A 6/2012
JP 2008044548 A 2/2008
(Continued)

OTHER PUBLICATIONS

International Search Report for corresponding International Application PCT/JP2016/060045, dated Jul. 16, 2016.
(Continued)

*Primary Examiner* — Nicholas K Wiltey
(74) *Attorney, Agent, or Firm* — Renner, Otto, Boisselle & Sklar, LLP

(57) ABSTRACT

[Problem] A drive recorder is provided that enables acquisition of a desired image captured when an impact with a strength meeting a predetermined condition has been measured. [Means of Solution] In the drive recorder 1, the travel recording module 51 records captured moving-imagery data 60 captured by a camera 18 installed on a vehicle. The acceleration sensor 19 measures the acceleration of the vehicle. When it is determined that the acceleration measured by the acceleration sensor 19 is within an abnormality range, the travel recording module 51 notifies the server 4 at a predetermined time point of the time point of dangerous driving at which the acceleration within the abnormality range was measured. The travel recording module 51, when receiving from the server 4 a request for video transmission containing the time point of dangerous driving, selects, from the recorded captured moving-imagery data 60, the captured moving-imagery data 60 associated with a predetermined (Continued)

time period including the time point of dangerous driving contained in the request for video transmission, and transmits this data to the server.

9 Claims, 10 Drawing Sheets

(51) Int. Cl.
| | | |
|---|---|---|
| H04N 7/18 | (2006.01) | |
| H04N 5/765 | (2006.01) | |
| B60R 21/00 | (2006.01) | |
| B60R 11/04 | (2006.01) | |
| G07C 5/00 | (2006.01) | |

(52) U.S. Cl.
CPC .............. *G07C 5/0816* (2013.01); *G08G 1/00* (2013.01); *H04N 5/765* (2013.01); *H04N 7/18* (2013.01); *G07C 5/0858* (2013.01)

(56) References Cited

U.S. PATENT DOCUMENTS

| | | | | |
|---|---|---|---|---|
| 6,037,860 | A * | 3/2000 | Zander | B60W 30/09 307/10.1 |
| 6,741,168 | B2 * | 5/2004 | Webb | G07C 5/008 180/271 |
| 7,119,669 | B2 * | 10/2006 | Lundsgaard | G08G 1/205 340/436 |
| 7,659,827 | B2 * | 2/2010 | Gunderson | G08G 1/16 340/576 |
| 7,809,586 | B2 * | 10/2010 | Wahlbin | G06Q 40/08 705/4 |
| 8,712,827 | B2 * | 4/2014 | Mollicone | G06Q 10/0639 705/7.38 |
| 9,646,428 | B1 * | 5/2017 | Konrardy | H04W 4/90 |
| 10,029,696 | B1 * | 7/2018 | Ferguson | B60W 50/14 |
| 10,032,318 | B1 * | 7/2018 | Ferguson | G07C 5/0825 |
| 10,414,407 | B1 * | 9/2019 | Slusar | B60W 40/09 |
| 10,692,378 | B2 * | 6/2020 | Shoda | G08G 1/162 |
| 2002/0041240 | A1 | 4/2002 | Ikeda et al. | |
| 2002/0111725 | A1 * | 8/2002 | Burge | G06Q 40/08 701/31.4 |
| 2003/0191568 | A1 * | 10/2003 | Breed | B60W 40/06 701/36 |
| 2004/0263647 | A1 * | 12/2004 | Yamaguchi | G07C 5/085 348/240.2 |
| 2005/0272388 | A1 * | 12/2005 | Giacaman | G08G 1/095 455/205 |
| 2006/0190822 | A1 * | 8/2006 | Basson | G06Q 10/10 715/700 |
| 2007/0027583 | A1 * | 2/2007 | Tamir | G06Q 30/0283 701/1 |
| 2007/0032929 | A1 * | 2/2007 | Yoshioka | G07C 5/008 701/33.4 |
| 2008/0147266 | A1 * | 6/2008 | Plante | G07C 5/008 701/33.4 |
| 2008/0255722 | A1 * | 10/2008 | McClellan | B60R 25/102 701/31.4 |
| 2008/0256549 | A1 * | 10/2008 | Liu | G06F 9/4881 718/106 |
| 2009/0105902 | A1 * | 4/2009 | Choi | G08G 1/162 701/33.4 |
| 2009/0112452 | A1 * | 4/2009 | Buck | G08G 1/096716 701/117 |
| 2009/0115590 | A1 * | 5/2009 | Brusarosco | B60C 23/064 340/444 |
| 2009/0177359 | A1 * | 7/2009 | Ihara | B60R 21/0134 701/45 |
| 2009/0198733 | A1 * | 8/2009 | Gounares | G06F 19/3418 |
| 2009/0210257 | A1 * | 8/2009 | Chalfant | G06Q 40/08 705/4 |
| 2009/0278933 | A1 * | 11/2009 | Maeda | G07C 5/0866 348/148 |
| 2009/0327508 | A1 * | 12/2009 | McCarthy | G01C 21/3647 709/231 |
| 2009/0328116 | A1 * | 12/2009 | McCarthy | H04N 7/17318 725/93 |
| 2010/0020170 | A1 * | 1/2010 | Higgins-Luthman | B60Q 1/1423 348/135 |
| 2010/0128127 | A1 * | 5/2010 | Ciolli | G08G 1/04 348/143 |
| 2010/0157061 | A1 * | 6/2010 | Katsman | G07C 5/008 348/149 |
| 2010/0238009 | A1 * | 9/2010 | Cook | G06Q 10/10 340/439 |
| 2010/0250021 | A1 * | 9/2010 | Cook | G07C 5/085 701/1 |
| 2010/0271480 | A1 * | 10/2010 | Bezborodko | G07C 5/085 348/148 |
| 2010/0312462 | A1 * | 12/2010 | Gueziec | G01C 21/3694 701/117 |
| 2010/0322476 | A1 * | 12/2010 | Kanhere | G08G 1/0175 382/103 |
| 2010/0332266 | A1 * | 12/2010 | Tamir | G06Q 30/0283 705/4 |
| 2011/0077955 | A1 * | 3/2011 | Whalen | G06Q 10/10 705/2 |
| 2011/0160964 | A1 * | 6/2011 | Obradovich | G06F 7/00 701/41 |
| 2011/0161116 | A1 * | 6/2011 | Peak | G06Q 40/08 705/4 |
| 2011/0213628 | A1 * | 9/2011 | Peak | G06Q 40/08 705/4 |
| 2011/0304447 | A1 * | 12/2011 | Marumoto | G07C 5/085 340/438 |
| 2012/0028680 | A1 * | 2/2012 | Breed | B60C 11/24 455/556.1 |
| 2012/0072241 | A1 * | 3/2012 | Krause | G06Q 40/08 705/4 |
| 2012/0089423 | A1 * | 4/2012 | Tamir | G06Q 30/0283 705/4 |
| 2012/0101680 | A1 * | 4/2012 | Trepagnier | G01S 17/023 701/26 |
| 2012/0143493 | A1 * | 6/2012 | Tang | G01C 21/3407 701/423 |
| 2012/0146766 | A1 * | 6/2012 | Geisler | H04W 4/90 340/8.1 |
| 2012/0194357 | A1 * | 8/2012 | Ciolli | G08G 1/04 340/936 |
| 2012/0196625 | A1 * | 8/2012 | Morrison | G06Q 30/02 455/456.3 |
| 2012/0224827 | A1 * | 9/2012 | Tano | G07C 5/008 386/227 |
| 2012/0226392 | A1 * | 9/2012 | Kataoka | G08G 1/167 701/1 |
| 2012/0296559 | A1 * | 11/2012 | Gueziec | G08G 1/0112 701/117 |
| 2013/0060583 | A1 * | 3/2013 | Collins | G06Q 40/08 705/4 |
| 2013/0096731 | A1 * | 4/2013 | Tamari | G06F 11/3013 701/1 |
| 2013/0129152 | A1 * | 5/2013 | Rodriguez Serrano | G06K 9/6255 382/105 |
| 2013/0157647 | A1 * | 6/2013 | Kolodziej | H04M 1/72522 455/419 |
| 2013/0166109 | A1 * | 6/2013 | Ginsberg | G08G 1/0967 701/2 |
| 2013/0184965 | A1 * | 7/2013 | Hunt | B60W 40/09 701/101 |
| 2013/0207829 | A1 * | 8/2013 | Kabler | G01S 7/022 342/20 |
| 2013/0211707 | A1 * | 8/2013 | Washlow | G01S 7/003 701/411 |
| 2013/0229523 | A1 * | 9/2013 | Higgins-Luthman | B60Q 1/1423 348/148 |

(56) References Cited

U.S. PATENT DOCUMENTS

| | | | | |
|---|---|---|---|---|
| 2014/0005922 A1* | 1/2014 | Bank | ................ | G01C 21/3626 |
| | | | | 701/423 |
| 2014/0266655 A1* | 9/2014 | Palan | ................ | G06K 9/00805 |
| | | | | 340/435 |
| 2015/0039175 A1* | 2/2015 | Martin | ................ | G06Q 40/08 |
| | | | | 701/31.5 |
| 2015/0039350 A1* | 2/2015 | Martin | ................ | G06Q 30/0261 |
| | | | | 705/4 |
| 2015/0058045 A1* | 2/2015 | Santora | ................ | G08G 1/162 |
| | | | | 705/4 |
| 2015/0088335 A1* | 3/2015 | Lambert | ................ | G08G 1/162 |
| | | | | 701/1 |
| 2016/0152211 A1* | 6/2016 | Owens | ................ | B60R 25/102 |
| | | | | 348/36 |
| 2017/0132709 A1* | 5/2017 | Liu | ................ | B60W 40/09 |
| 2017/0263061 A1* | 9/2017 | Mann | ................ | G07C 5/0808 |
| 2017/0291611 A1* | 10/2017 | Innes | ................ | B60W 40/09 |
| 2018/0126901 A1* | 5/2018 | Levkova | ................ | B60Q 9/00 |
| 2018/0184014 A1* | 6/2018 | Goldstein | ................ | H04N 5/272 |
| 2018/0215344 A1* | 8/2018 | Santora | ................ | H04N 5/2258 |
| 2020/0098202 A1* | 3/2020 | Egami | ................ | H04W 4/40 |
| 2020/0164896 A1* | 5/2020 | Sakurada | ................ | B60W 50/12 |

FOREIGN PATENT DOCUMENTS

| | | |
|---|---|---|
| JP | 2011131728 A | 7/2011 |
| JP | 2012164218 A | 8/2012 |
| JP | 2013161238 A | 8/2013 |
| JP | 2014075035 A | 4/2014 |
| WO | WO 2008/072305 A1 | 6/2008 |

OTHER PUBLICATIONS

Extended European Search Report for corresponding European Application No. 16782956.3, dated Sep. 21, 2018.

* cited by examiner

DETERMINATION REFERENCE DATA 70

| | ACCELERATION Ax (m/s$^2$) |
|---|---|
| ABNORMALITY RANGE | $8.0 \leq Ax \leq 10.0$, $-10.0 \leq Ax \leq -8.0$ |
| ACCIDENT REFERENCE RANGE | $10.0 < Ax$ $Ax < -10.0$ |
| STOP RANGE | $-0.5 \leq Ax \leq 0.5$ |

FIG. 7

DATA OF DANGEROUS DRIVING 72

| DEVICE ID | RECORD ID | TIME POINT OF DANGEROUS DRIVING | POSITION | ACCELERATION (m/s²) | TRANSMISSION FLAG | STILL IMAGE PATH | EXTRACTED MOVING-IMAGERY PATH | |
|---|---|---|---|---|---|---|---|---|
| 1 | 1 | 2015/4/10 9:14:35 | N34.6902 E135.5166 | 9.66 | 1 | C:¥photo¥p1.jpg | C:¥movie¥m1.mov | 72A |
| 1 | 2 | 2015/4/10 9:27:59 | N34.6819 E135.5236 | 8.84 | 1 | C:¥photo¥p2.jpg | C:¥movie¥m2.mov | 72B |
| 1 | 3 | 2015/4/10 9:31:49 | N34.6741 E135.4966 | 8.25 | 0 | C:¥photo¥p3.jpg | C:¥movie¥m3.mov | 72C |
| 1 | 4 | 2015/4/10 9:34:11 | N34.6664 E135.5003 | 9.10 | 0 | C:¥photo¥p4.jpg | C:¥movie¥m4.mov | 72D |
| 1 | 5 | 2015/4/10 9:36:41 | N34.6656 E135.4800 | 8.71 | 0 | C:¥photo¥p5.jpg | C:¥movie¥m5.mov | 72E |

DRIVE RECORDER

TECHNICAL FIELD

The present invention relates to a drive recorder, and more particularly, to a drive recorder mounted on a vehicle such as an automobile or a motorcycle travelling on the road.

BACKGROUND ART

A drive recorder is mounted on a vehicle such as an automobile that may travel on the road, and records video captured by a camera directed forward with respect to the vehicle. Images captured by the camera are recorded on a detachable recording medium, such as a memory card. If an image recorded on the memory card is stored in an external device (e.g. server), operations such as detaching of the memory card from the drive recorder are necessary. Such operations represent a burden on the driver of the vehicle.

In view of this, drive recorders have been proposed that identify a time point at which an acceleration above a predetermined threshold was detected and transmit to the server images captured during a predetermined time period associated with that point. The detected acceleration indicates the strength of an impact applied to the drive recorder. However, such a drive recorder must transmit images each time an acceleration above a predetermined value is detected. This results in very large amounts of transmission, requiring high transmission costs.

Patent Document 1 discloses a vehicle-mounted recorder mounted on a railway vehicle which, in response to a request from a command center, transmits video captured when an application of the emergency brake was detected.

The vehicle-mounted recorder according to Patent Document 1 is installed on the lead vehicle of a train and records video of a scene in the direction of advance of the train. When the vehicle-mounted recorder detects emergency braking based on the acceleration measured by the acceleration meter, it notifies the command center of an occurrence of emergency braking. To prevent the video ending at the time point of the detection of emergency braking of the train and starting at the time point going back a predetermined time period (also known as emergency-braking imagery) from being deleted, the vehicle-mounted recorder changes the storage region for video recording from the region that has been used until the emergency braking was detected over to another recording region.

When a train has applied the emergency brake, the operator at the command center contacts the driver of the train to determine whether to check the video captured upon the application of the emergency brake. When the operator determines that he needs to check the video, he requests the vehicle-mounted recorder to transmit images captured upon the application of the emergency brake. In response to the request from the command center, the vehicle-mounted recorder transmits emergency braking images to the command center.

In the context of an automobile, the number of times that an acceleration that would correspond to railway emergency braking is detected is overwhelmingly larger than at a train. If the vehicle-mounted recorder according to Patent Document 1 is mounted on an automobile, it is not realistic that the vehicle administrator determines whether images need to be stored each time he is notified of an application of the emergency brake. In the context of a drive recorder mounted on a vehicle travelling on the road, such as an automobile, it is desirable that images captured when operations such as sudden braking were done be checked afterward and used to help manage the vehicle operation.

Patent Document 1 describes a situation where the train driver applies the emergency brake and discusses the problem of how the command center can accurately and quickly learn how the application of the emergency brake happened at the train, while reducing the burden on the driver. That is, the vehicle-mounted recorder according to Patent Document 1 does not contemplate checking past conditions of the emergency braking, making it impossible to acquire images relating to past emergency braking from the vehicle-mounted recorder.

PRIOR ART DOCUMENTS

Patent Documents

Patent Document 1: JP 2008-44548 A

SUMMARY OF THE INVENTION

Problems to be Solved by the Invention

An object of the present invention is to provide a drive recorder that enables acquisition of a desired image captured when an impact with a strength meeting a predetermined condition has been measured.

Means for Solving the Problems and Effects of the Invention

A drive recorder according to the present invention includes: a recording unit; a sensor; a determination unit; a notification unit; and a video transmission unit. The recording unit records captured moving-imagery data captured by a camera installed on a vehicle. The sensor measures a strength of an impact applied to the drive recorder. The determination unit determines whether the strength of the impact measured by the sensor is within a predetermined abnormality range. The notification unit notifies, when the determination unit determines that the strength of the impact measured by the sensor is within the abnormality range, the server at a predetermined time point of a time point of dangerous driving at which the impact with the strength within the abnormality range was measured. The video transmission unit, when receiving from the server a request for video transmission containing the time point of dangerous driving, transmits to the server, out of the captured moving-imagery data created by the recording unit, captured moving-imagery data associated with a predetermined time period including the time point of dangerous driving contained in the request for video transmission.

According to the present invention, the server is notified of the time point of dangerous driving at which an impact of a strength within the abnormality range was measured, and, in response to the request by the server, captured moving-imagery data for a predetermined time period including the time point of dangerous driving is transmitted to the server. Thus, the administrator of the server can acquire captured moving-imagery data captured at any desired time point of dangerous driving selected from among the time points of dangerous driving of which he was notified.

Preferably, when the determination unit determines that the measured strength of the impact is within the abnormality range, the recording unit creates a still image associated with the time point of dangerous driving based on an image captured by the camera. The notification unit transmits the still image created by the recording unit together with the time point of dangerous driving.

According to the present invention, a still image for the time point of dangerous driving is transmitted to the server together with the time point of dangerous driving. This provides a reference based on which it is determined whether the captured moving-imagery data for the time point of dangerous driving should be acquired.

Preferably, when the determination unit determines that the measured strength of the impact is within the abnormality range, the recording unit extracts the captured moving-imagery data associated with the predetermined time period including the time point of dangerous driving from the captured moving-imagery data created by the recording unit. The video transmission unit transmits, out of the captured moving-imagery data extracted by the recording unit, the captured moving-imagery data associated with the predetermined time period including the time point of dangerous driving.

According to the present invention, each time an impact with a strength within the abnormality range is measured, captured moving-imagery data associated with a predetermined time period including the time point of dangerous driving is extracted from the captured moving-imagery data that has been recorded. The drive recorder of the present invention, when receiving a request for video transmission, can quickly transmit the captured moving-imagery data for the time point of dangerous driving specified by the server.

Preferably, the determination unit determines whether the measured strength of the impact is within a predetermined accident reference range. The strength of an impact within the accident reference range is larger than the strength of an impact within the abnormality range. When the determination unit determines that the measured strength of the impact is within the accident reference range, the video transmission unit transmits to the server, out of the captured moving-imagery data created by the recording unit, captured moving-imagery data associated with a predetermined time period including a time point at which the impact with the strength within the accident reference range was measured.

According to the present invention, if an impact is measured that is within an accident reference range that defines impact strengths larger than the impact strengths within the abnormality range, the captured moving-imagery data captured when the impact within the accident reference range was measured is transmitted regardless of whether the server has requested it or not. This will prevent the captured moving-imagery data captured upon an accident recorded by the drive recorder from being lost.

Preferably, the drive recorder further includes a time recording unit. The time recording unit records, in data of dangerous driving, the time point of dangerous driving. The notification unit transmits the data of dangerous driving to the server at a predetermined time interval.

According to the present invention, data of dangerous driving is transmitted at a predetermined time interval, thereby reducing the amount of transmission.

A vehicle administration system according to the present invention includes: a server; and the drive recorder according to the present invention. The drive recorder according to the present invention is installed on a vehicle. The server is capable of communicating with the drive recorder over a network. The server includes: a registration unit; a selection unit; and a video requesting unit. The registration unit registers, in drive administration data, the time point of dangerous driving of which the server has been notified by the notification unit. The selection unit selects at least one of time points of dangerous driving that have been registered in the drive administration data. The video requesting unit transmits, to the drive recorder, the request for video transmission containing the time point of dangerous driving selected by the selection unit.

According to the present invention, the server is capable of acquiring the captured moving-imagery data for any desired time point of dangerous driving out of the time points of dangerous driving of which it has been notified by the drive recorder.

A program according to the present invention is used in the drive recorder according to the present invention.

BRIEF DESCRIPTION OF THE DRAWINGS

FIG. 7 illustrates an exemplary abnormality range and an exemplary accident reference range specified in the determination reference data shown in FIG. 2.

FIG. 8 illustrates exemplary data of dangerous driving shown in FIG. 2.

EMBODIMENTS FOR CARRYING OUT THE INVENTION

Figure 1:
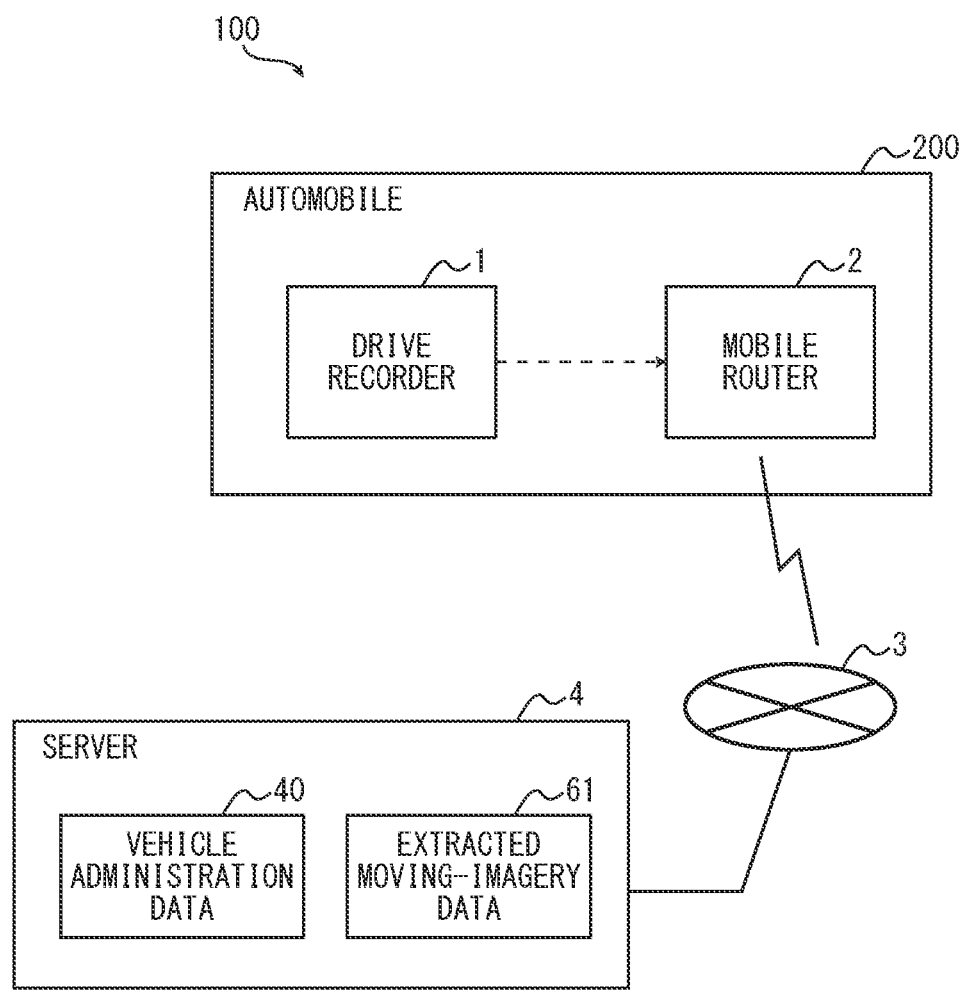
FIG. 1 is a functional block diagram of a vehicle administration system according to an embodiment of the present invention.

Embodiments of the present invention will now be described in detail with reference to the drawings. The same or corresponding elements in the drawings are labeled with the same characters and their description will not be repeated.

[1. Configuration of Vehicle Administration System]

FIG. 1 is a functional block diagram of a vehicle administration system 100 according to an embodiment of the present invention. Referring to FIG. 1, the vehicle administration system 100 is a system for recording the travel conditions of a vehicle travelling on the road (e.g. automobile or motorcycle). For example, the vehicle administration system 100 may be used by a transportation company to manage the travel conditions of its own trucks.

The vehicle administration system 100 includes a drive recorder 1, a mobile router 2, and a server 4. The drive recorder 1 and mobile router 2 are mounted on an automobile 200 such as a truck. The server 4 is installed in an office of a company, for example, which uses the vehicle administration system 100.

The drive recorder 1 records captured moving-imagery data captured by a camera. When an acceleration measured by an acceleration sensor is within a predetermined abnormality range, the drive recorder 1 at a predetermined time point notifies the server 4 of the time point of dangerous driving at which the acceleration within the abnormality range was measured. The drive recorder 1, when receiving a request for video transmission containing a time point of dangerous driving from the server 4, transmits extracted moving-imagery data 61 to the server 4. The extracted moving-imagery data 61 is captured moving-imagery data associated with a predetermined time period including the time point of dangerous driving contained in the request for video transmission.

The mobile router 2 is a communication device that supports both a wireless communication specification covering middle to long distances (i.e. mobile-phone communication system) and a wireless communication specification covering short distances (i.e. wireless Local Area Network (LAN)). The mobile router 2 uses the wireless LAN to communicate with the drive recorder 1, and uses the mobile-phone communication system to connect to the Internet 3.

The server 4 is capable of connecting to the Internet 3, and records, in vehicle administration data 40, time points of dangerous driving of which it has been notified by the drive recorder 1. The server 4 selects, from among time points of dangerous driving registered in the vehicle administration data 40, at least one time point of dangerous driving in response to a command by the operation administrator operating the server 4. The server 4 transmits, to the drive recorder 1, a request for video transmission containing the selected time point of dangerous driving.

[2. Configuration of Drive Recorder 1]

Figure 2:
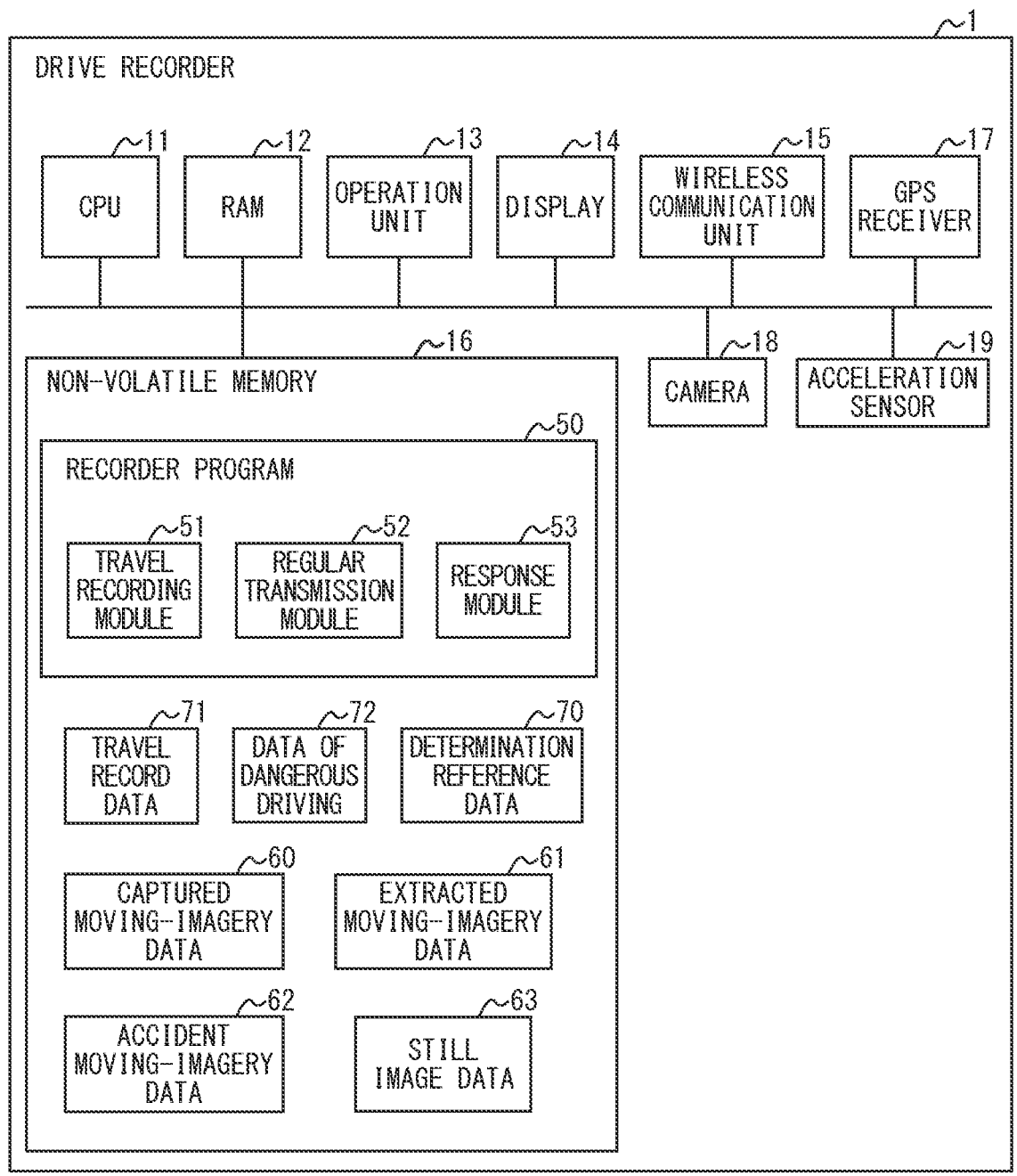
FIG. 2 is a functional block diagram of the drive recorder shown in FIG. 1.

FIG. 2 is a functional block diagram of the drive recorder 1 shown in FIG. 1. Referring to FIG. 2, the drive recorder 1 is a computer system implementing the drive recorder functionality. The drive recorder 1 includes a central processing unit (CPU) 11, random access memory (RAM) 12, an operation unit 13, a display 14, a wireless communication unit 15, a non-volatile memory 16, a global positioning system (GPS) receiver 17, a camera 18, and an acceleration sensor 19.

The CPU 11 executes a program loaded into the RAM 12 to control the drive recorder 1. The RAM 12 is the main memory for the drive recorder 1. Various programs stored in the non-volatile memory 16 are loaded into the RAM 12.

The operation unit 13 is represented by buttons and other elements provided on the housing of the drive recorder 1. The user may operate the operation unit 13 to instruct the drive recorder 1 to initiate or terminate travel recording. The display 14 displays pictures captured by the camera 18, for example.

The wireless communication unit 15 is a communication interface for the wireless LAN, and communicates with the mobile router 2.

The non-volatile memory 16 may be an NAND flush memory, for example, that stores programs and various data indicating the travel conditions of the vehicle. Details of the programs and data stored in the non-volatile memory 16 will be given further below.

The GPS receiver 17 receives GPS signals and uses the received GPS signals to provide the current location of the drive recorder 1. The camera 18 captures the scene in front of the vehicle. The acceleration sensor 19 measures the acceleration of the drive recorder 1. The acceleration sensor 19 is a sensor for measuring the strength of an impact applied to the drive recorder 1.

The programs and data stored in the non-volatile memory 16 will now be described in detail. The non-volatile memory 16 stores a recorder program 50, determination reference data 70, travel record data 71, data of dangerous driving 72, captured moving-imagery data 60, extracted moving-imagery data 61, accident moving-imagery data 62, and still image data 63.

The recorder program 50 is a program implementing the drive recorder functionality. The recorder program 50 includes a travel recording module 51, a regular transmission module 52, and a response module 53.

The travel recording module 51 encodes pictures captured by the camera 18 and records them. When an acceleration within the abnormality range is measured, the travel recording module 51 records, in the data of dangerous driving 72, the time point of dangerous driving at which the acceleration within the abnormality range was measured. Details of the process performed by the travel recording module 51 will be given further below.

At a predetermined transmission interval, the regular transmission module 52 transmits to the server 4 a time point of dangerous driving recorded in the data of dangerous driving 72. Details of the process performed by the regular transmission module 52 will be given further below.

When receiving a request for video transmission from the server 4, the response module 53 transmits to the server 4 extracted moving-imagery data 61 associated with the time point of dangerous driving contained in the request for video transmission. Details of the process performed by the response module 53 will be given further below.

The captured moving-imagery data 60 is created as pictures captured by the camera 18 are encoded. FIG. 2 only shows one set of captured moving-imagery data 60. In reality, however, since captured moving-imagery data 60 is created in the form of one file at an interval of 20 minutes, the non-volatile memory 16 stores one or more sets of captured moving-imagery data 60.

The extracted moving-imagery data 61 is created by extracting, from the captured moving-imagery data 60 recorded in the non-volatile memory 16, captured moving-imagery data 60 associated with a predetermined time period including a time point of dangerous driving. The still image data 63 is the frame of captured moving-imagery data that is associated with the time point of dangerous driving. FIG. 2 only shows one set of extracted moving-imagery data 61 and one set of still image data 63; in reality, however, a set of extracted moving-imagery data 61 and a set of still image data 63 are created each time an acceleration within the abnormality range is measured.

The accident moving-imagery data 62 is created when an acceleration within an accident reference range has been measured. The created accident moving-imagery data 62 is immediately transmitted to the server 4. Details of the accident moving-imagery data 62 will be given further below.

The determination reference data 70 is a table defining a range of accelerations indicating that dangerous driving has occurred (i.e. abnormality range) and a range of accelerations indicating that a traffic accident has occurred (i.e. accident reference range).

The travel record data 71 indicates travel conditions of the vehicle recorded at a certain interval (for example, every second). The travel record data 71 has recorded therein positional information, acceleration and other information about the vehicle on which the drive recorder 1 is mounted.

The data of dangerous driving 72 has recorded therein a time point of dangerous driving at which an acceleration within the abnormality range was measured and travel conditions of the vehicle at the time point of dangerous driving. Details of the data of dangerous driving 72 will be given further below.

[3. Configuration of Server 4]

Figure 3:
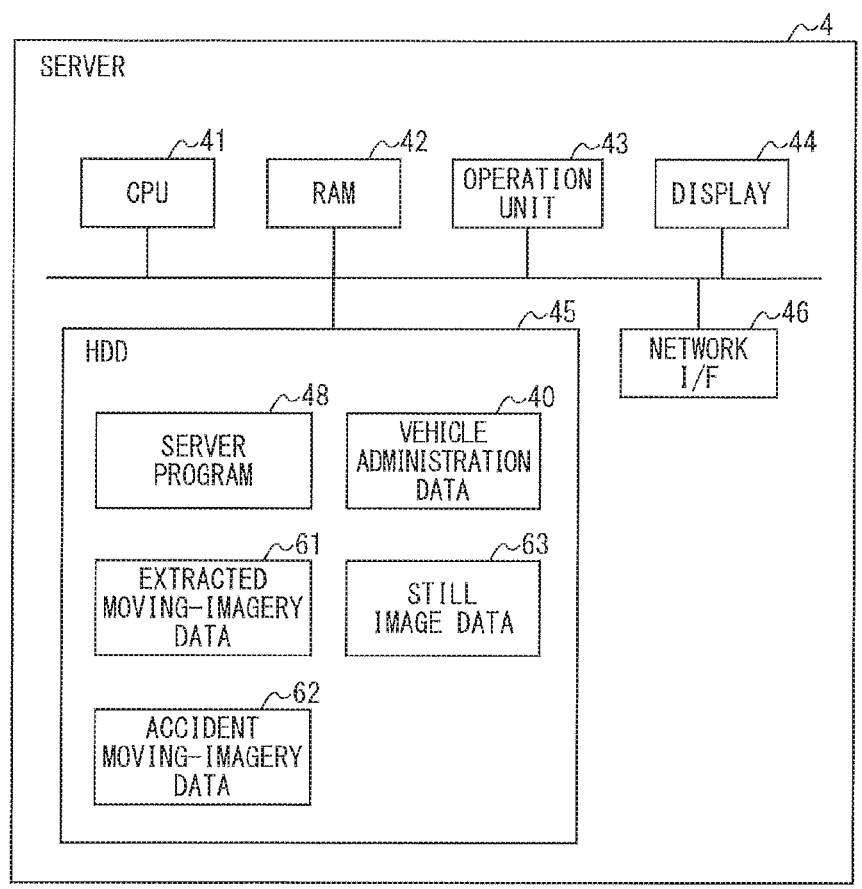
FIG. 3 is a functional block diagram of the server shown in FIG. 1.

FIG. 3 is a functional block diagram of the server 4 shown in FIG. 1. Referring to FIG. 3, the server 4 is a personal computer (PC) having server functionality, for example. The server 4 includes a CPU 41, RAM 42, an operation unit 43, a display 44, a hard disk drive (HDD) 45, and a network I/F 46.

The CPU 41 executes programs loaded into the RAM 42 to control the server 4. The RAM 42 is the main memory for the server 4. Various programs stored on the HDD 45 are loaded into the RAM 42.

The operation unit 43 is represented by a keyboard and a mouse and provides information depending on operations by the user. The display 44 displays the results of the execution of programs by the CPU 41.

The HDD 45 stores a server program 48, vehicle administration data 40, extracted moving-imagery data 61, accident moving-imagery data 62, and still image data 63.

The server program 48 is a program that enables the PC to function as the server 4. As the server program 48 is installed on the PC, the PC can work as the server 4.

Figure 4:
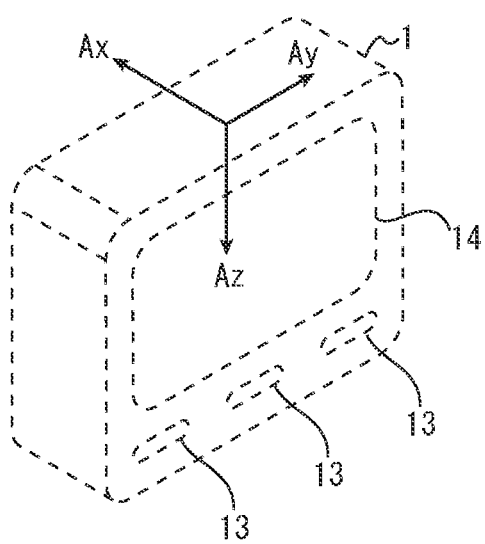
FIG. 4 is an external view of the drive recorder shown in FIG. 1.

The vehicle administration data 40 is used to record a time point of dangerous driving of which the server has been notified by the drive recorder 1. FIG. 4 only shows one set of vehicle administration data 40; however, a set of vehicle administration data 40 is created for each drive recorder. The still image data 63 is transmitted by the drive recorder 1 together with the time point of dangerous driving.

The extracted moving-imagery data 61 is transmitted by the drive recorder 1 as a response to a request for video transmission transmitted by the server 4. When an acceleration within the accident reference range is measured by the drive recorder 1, the accident moving-imagery data 62 is transmitted by the drive recorder 1.

The network I/F 46 accesses the Internet 3 via the LAN and communicates using the Transmission Control Protocol (TCP)/Internet Protocol (IP).

[4. Outline of Operation of Vehicle Administration System 100]

An outline of the operation of the vehicle administration system 100 shown in FIG. 1 will be given below. FIG. 4 is an external perspective view of the drive recorder 1. Referring to FIG. 4, the drive recorder 1 has the shape of a rectangular parallelepiped. The camera 18 is provided on the side of the drive recorder 1 opposite to the side on which the display 14 is provided. The drive recorder 1 is fixed at an appropriate location within the vehicle that allows the camera 18 to capture the scene in front of the vehicle.

The directions defined in connection with the drive recorder 1 will be explained. In connection with the drive recorder 1, the front-rear direction is the direction perpendicular to the face on which the display 14 is provided. The forward direction is the direction of capture by the camera 18, and the rearward direction is the direction opposite to the direction of capture by the camera 18. The left-right direction is the direction parallel to the long sides of the display 14. The top-bottom direction is the direction parallel to the short sides of the display 14.

The acceleration sensor 19 of the drive recorder 1 is capable of measuring accelerations in the front-rear, left-right, and top-bottom directions. The acceleration Ax is an acceleration in the front-rear direction with respect to the drive recorder 1. The acceleration Ay is an acceleration in the left-right direction with respect to the drive recorder 1. The acceleration Az is an acceleration in the top-button direction with respect to the drive recorder 1.

Figure 5:
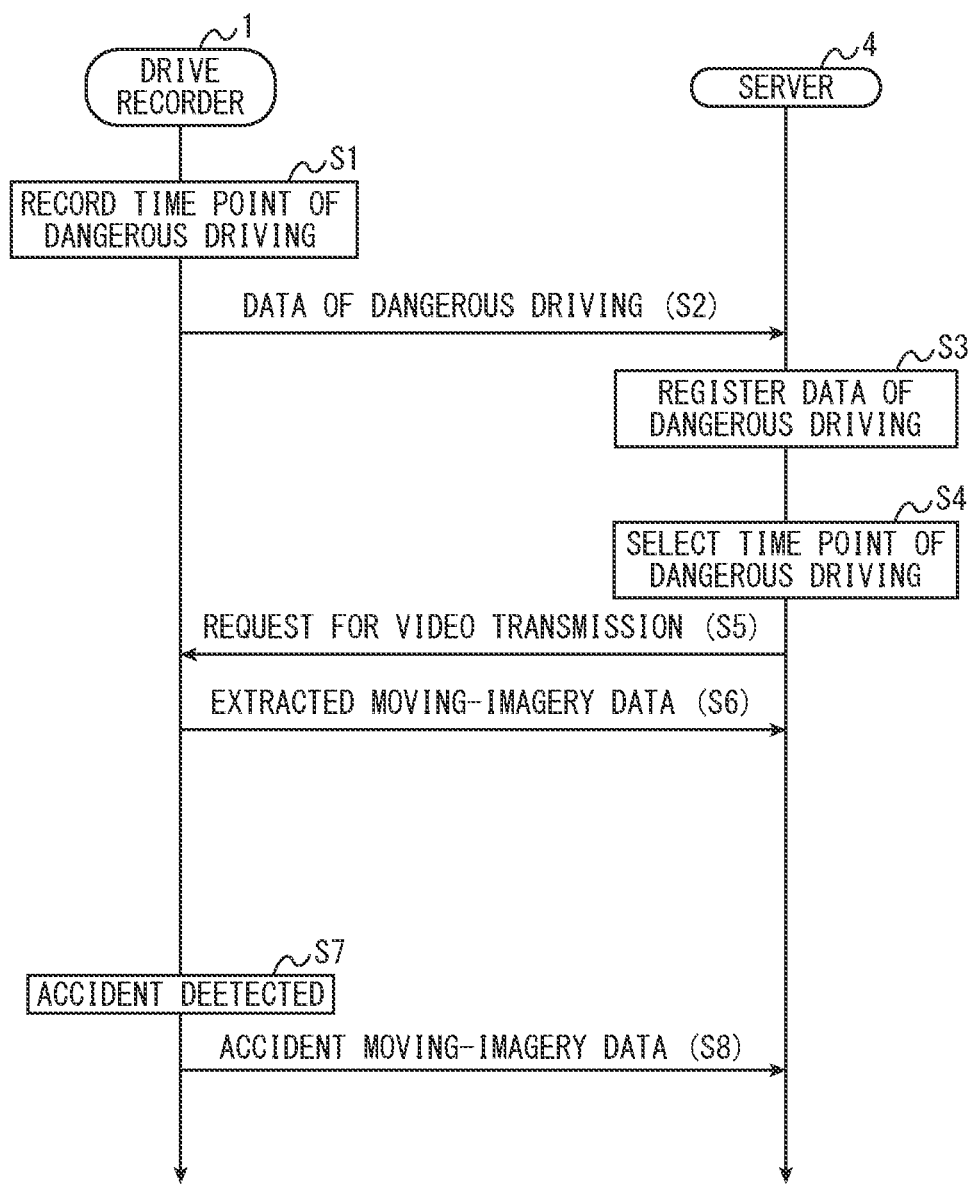
FIG. 5 is a sequence diagram schematically illustrating the operation of the vehicle administration system shown in FIG. 1.

FIG. 5 is a sequence diagram schematically illustrating the operation of the vehicle administration system 100 shown in FIG. 1. The present embodiment describes an implementation where the drive recorder 1 only uses the acceleration Ax.

Referring to FIG. 5, in response to an operation by the driver of the vehicle on which it is mounted, the drive recorder 1 initiates the recorder program 50. As the recorder program 50 is initiated, the drive recorder 1 initiates recording of pictures captured by the camera 18.

The drive recorder 1 determines whether an acceleration Ax measured by the acceleration sensor 19 is within the abnormality range determined in advance in the determination reference data 70. The abnormality range has been set to a range of accelerations that are expected to be measured when the driver drives dangerously. Dangerous driving means a driving operation that may cause a traffic accident, such as sudden braking or sudden starting. If the acceleration Ax is within the abnormality range, the drive recorder 1 records the time point at which the acceleration Ax within the abnormality range was measured (i.e. time point of dangerous driving) into the data of dangerous driving 72 (step S1).

At a certain transmission interval (for example, every 30 minutes), the drive recorder 1 transmits the data of dangerous driving 72 to the server 4 (step S2). If a plurality of accelerations Ax within the abnormality range have been detected until the data of dangerous driving 72 is transmitted, the data of dangerous driving 72 that is transmitted has a plurality of time points of dangerous driving recorded therein.

The server 4 registers the data of dangerous driving 72 transmitted from the drive recorder 1 into the vehicle administration data 40 associated with the transmitting drive recorder 1 (step S3). Thus, the time point of dangerous driving is recorded in the vehicle administration data 40.

In response to an operation by the vehicle administrator, the server 4 selects at least one time point of dangerous driving from among the time points of dangerous driving recorded in the vehicle administration data 40 associated with the drive recorder 1 (step S4). The server 4 transmits, to the drive recorder 1, a request for video transmission containing the selected time point of dangerous driving (step S5).

When the drive recorder 1 has received the request for video transmission from the server 4, it transmits, to the server 4, captured moving-imagery data 60 associated with a predetermined time period including the time point of dangerous driving contained in the request for video transmission (i.e. extracted moving-imagery data 61) (step S6). The vehicle administrator replays the extracted moving-imagery data 61 transmitted by the drive recorder 1 to learn the travel conditions of the automobile encountered when the acceleration Ax within the abnormality range was measured.

When the drive recorder 1 detects a traffic accident, it performs a process different from that performed when it detects dangerous driving. More specifically, when the drive recorder 1 determines that the acceleration Ax is within the accident reference range, it waits until a predetermined determination waiting time has passed, which starts at the time at which the acceleration Ax was determined to be within the accident reference range. If the automobile 200 is standing still after the determination waiting time, the drive recorder 1 determines that a traffic accident has occurred (step S7). The relationship between the abnormality range and the accident reference range will be described further below.

When the drive recorder 1 determines that a traffic accident has occurred, it extracts, from the captured moving-imagery data 60, accident moving-imagery data 62 associated with the predetermined time period including the time at which the traffic accident occurred, and send it to the server 4 (step S8).

In FIG. 5, the detection of a traffic accident (step S7) occurs after the process relating to dangerous driving (steps S1 to S6). However, the detection of a traffic accident is not limited to the timing shown in FIG. 5. For example, when the drive recorder 1 detects a traffic accident (step S7) directly after the transmission of data of dangerous driving 72 (step S2), it sends accident moving-imagery data 62 to the server 4 (step S8) without waiting for a request for video transmission (step S5).

[5. Operation of Drive Recorder 1]

[5.1 Process by Travel Recording Module 51]

Figure 6:
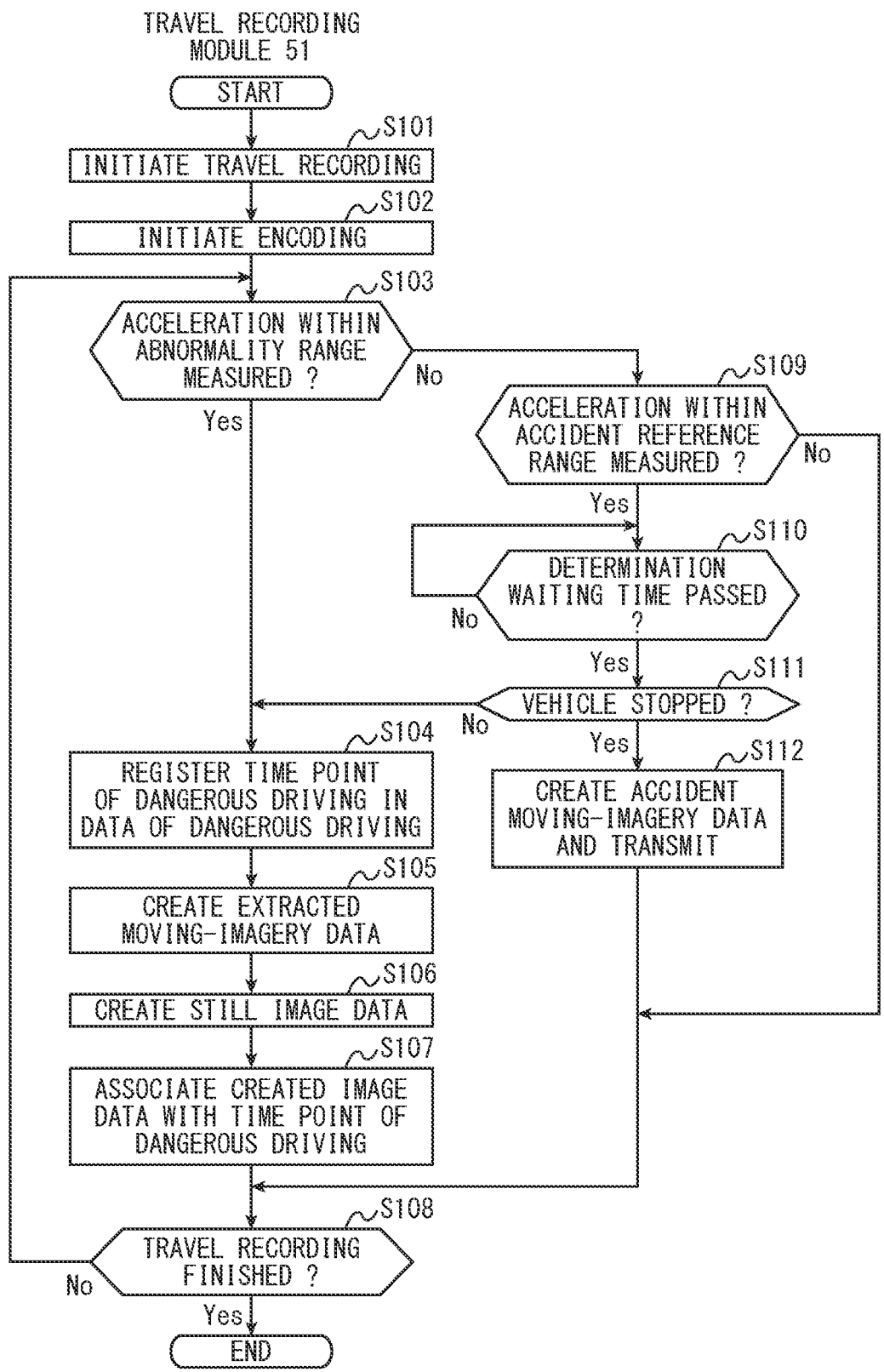
FIG. 6 is a flow chart for the travel recording module shown in FIG. 2.

FIG. 6 is a flow chart showing the operation of the travel recording module 51 shown in FIG. 2. When the driver operates the operation unit 13 to instruct the drive recorder to initiate travel recording, the travel recording module 51 initiates the process shown in FIG. 6.

The travel recording module 51 initiates creation of travel record data 71 (step S101). For example, device ID, time point, position, acceleration measured by the acceleration sensor 19 and other information are recorded in the travel record data 71 every one second. The device ID is identification information associated with the drive recorder 1.

The travel recording module 51 initiates encoding of pictures captured by the camera 18 (step S102). Thus, the pictures captured by the camera 18 are recorded in the non-volatile memory 16 to provide captured moving-imagery data 60. The encoding method may be MPEG-4, for example. The travel recording module 51 divides the captured moving-imagery data 60 into sections each for 20 minutes, for example. In this case, three sets of captured moving-imagery data 60 are created for one hour.

In the captured moving-imagery data 60, each frame is associated with a time point of capture by the camera 18. Each frame may be associated with an actual time point of capture by the camera 18. The actual time point may be acquired from a GPS signal, for example. Alternatively, each frame may be associated with a time elapsed since the first frame. In this case, the first frame is associated with an actual time point of capture by the camera 18.

(Registration of Time Points of Dangerous Driving)

The travel recording module 51 determines whether an acceleration Ax measured by the acceleration sensor 19 is within the abnormality range (step S103). If the acceleration Ax is within the abnormality range (Yes at step S103), then, the travel recording module 51 performs steps S104 to S107 to register, in the data of dangerous driving 72, travel conditions of the vehicle at the time point at which the acceleration Ax within the abnormality range was measured.

FIG. 7 illustrates examples of abnormality range, accident reference range and stop range specified in the determination reference data 70. Referring to FIG. 7, the abnormality range for the acceleration Ax is set to not less than 8.0 (m/s$^2$) and not more than 10.0 (m/s$^2$) and not less than −10.0 (m/s$^2$) and not more than −8.0 (m/s$^2$). As discussed above, abnormality range is a range of accelerations that are expected to be measured when dangerous driving occurs. Accident reference range and stop range will be described further below.

If the acceleration Ax is within the abnormality range discussed above (Yes at step S103), the travel recording module 51 designates the time point at which the acceleration Ax within the abnormality range was measured as a time point of dangerous driving. The travel recording module 51 registers the designated time point of dangerous driving in the data of dangerous driving 72 (step S104).

FIG. 8 illustrates exemplary data of dangerous driving 72. Referring to FIG. 8, the data of dangerous driving 72 is in table format. In addition to time point of dangerous driving, the travel recording module 51 registers device ID, record ID, position, acceleration, transmission flag, still image path and extracted moving-imagery path in the data of dangerous driving 72.

Device ID is identification information associated with the drive recorder 1. Record ID is identification information associated with a time point of dangerous driving registered in the data of dangerous driving 72 and the main key for the data of dangerous driving 72. Position indicates the latitude and longitude of the drive recorder 1 at a time point of dangerous driving. Acceleration indicates an acceleration Ax measured at the time point of dangerous driving. Still image path indicates the location of still image data 63 in the non-volatile memory 16 at the time point of dangerous driving. Extracted moving-imagery path indicates the location of extracted moving-imagery data 61 in the non-volatile memory 16 at the time point of dangerous driving. Transmission flag indicates whether the time point of dangerous driving has been transmitted to the server 4. If the transmission flag shows "1", the transmission flag indicates that the associated record has been transmitted to the server 4. If the transmission flag shows "0", the transmission flag indicates that the associated record has not been transmitted to the server 4.

The following process is performed to register the time point of dangerous driving in the data of dangerous driving 72. If records, 72A to 72E, have already been recorded in the data of dangerous driving 72, a record to which a new record ID is assigned is created. The travel recording module 51 registers the time point of dangerous driving in the new record. The device ID, acceleration Ax and transmission flag are registered together with the time point of dangerous driving. Since the created record has not been transmitted to the server 4, the registered value of the transmission flag is "0". The still image path and extracted moving-image path are registered after steps S105 and S106 are performed.

Subsequently, the travel recording module 51 creates extracted moving-imagery data 61 (step S105). More specifically, the travel recording module 51 specifies a period beginning 15 seconds before the identified time point of dangerous driving and ending 15 seconds after the time point of dangerous driving (hereinafter referred to as time period of dangerous driving). Captured moving-imagery data 60 associated with the time period of dangerous driving is extracted from the captured moving-imagery data 60 recorded in the non-volatile memory 16. Thus, the extracted moving-imagery data 61 associated with the identified time point of dangerous driving is created. The extracted moving-imagery data 61 that has been created is stored in the non-volatile memory 16.

If the time period of dangerous driving stretches across two sets of captured moving-imagery data 60, the travel recording module 51 combines these two sets of captured moving-imagery data 60 and then creates the extracted moving-imagery data 61.

The travel recording module 51 creates still image data 63 for the identified time point of dangerous driving (step S106). More specifically, the travel recording module 51 takes a frame for the time point of dangerous driving from the created extracted moving-imagery data 61. The travel recording module 51 encodes the taken frame in JPEG format to create still image data 63.

The travel recording module 51 associates the extracted moving-imagery data 61 created at step S105 and the still image data 63 created at step S106 with the time point of dangerous driving registered at step S104 (step S107). An extracted moving-imagery path indicating the location of the created extracted moving-imagery data 61 in the non-volatile memory 16 is registered in the data of dangerous driving 72. Similarly, a still image path indicating the location of the still image data 63 is recorded in the data of dangerous driving 72.

Once the process of step S107 is completed, the travel recording module 51 determines whether the drive recorder has been instructed to terminate travel recording (step S108). If it has not been instructed to do so (No at step S108), the travel recording module 51 returns to step S103. On the other hand, if it has been instructed to do so (Yes at step S108), the travel recording module 51 terminates the process shown in FIG. 6.

(Transmission of Accident Moving-Imagery Data 62)

Referring to FIG. 6, if the acceleration Ax measured by the acceleration sensor 19 is not within the abnormality range (No at step S103), the travel recording module 51 determines whether the acceleration Ax is within the accident reference range (step S109).

Referring to FIG. 7, the accident reference range is composed of, for example, the sub-range more than 10.0 (m/s$^2$) and the sub-range less than −10.0 (m/s$^2$). The accident reference range covers accelerations larger than those during dangerous driving. This is in view of the fact that an impact upon a traffic accident is expected to be larger than an impact during dangerous driving. The positive sub-range of the accident reference range is set to a range including accelerations larger than the accelerations for the abnormality range and the negative sub-range is set to a range including accelerations smaller than the accelerations for the abnormality range.

If the acceleration Ax is not within the accident reference range (No at step S109), the travel recording module 51 determines that normal driving is occurring, and proceeds to step S108.

On the other hand, if the acceleration Ax is within the accident reference range (Yes at step S109), a traffic accident may have occurred. In this case, the travel recording module 51 waits until a predetermined determination waiting time passes (Yes at step S110). The determination waiting time may be set to 30 seconds, for example.

After the determination waiting time has passed (Yes at step S110), the travel recording module 51 determines whether the automobile 200 has stopped (step S111). When a traffic accident occurs while the automobile 200 is travelling, the driver is expected to stop the automobile 200. Or, the automobile 200 may turn over on its side and be unable to travel. In view of this, if an acceleration Ax within the accident reference range is measured, the travel recording module 51 determines whether a traffic accident has occurred or not based on whether the automobile 20 is stationary after a determination waiting time.

More specifically, referring to FIG. 7, it is determined whether the acceleration Ax is within the stop range designated in the determination reference data 70. The stop range may be set to, for example, a range of accelerations of −0.5 (m/s$^2$) or more and 0.5 (m/s$^2$) or less. Even if the automobile 200 is stationary, the acceleration sensor 19 continues to measure an acceleration Ax that is not zero due to vibrations of the engine, for example. In view of this, the stop range is a predetermined range of accelerations including zero.

If the acceleration Ax is not within the stop range, the travel recording module 51 determines that the automobile 200 is continuing travelling (No at step S111). For example, it may be assumed that the automobile 200 has passed over a step on the road, resulting in an acceleration Ax within the accident reference range being measured. In this case, the travel recording module 51 determines that no traffic accident has occurred and proceeds to step S104. At step S104, the time at which the acceleration Ax within the accident reference range was measured is registered in the data of dangerous driving 72 as a time point of dangerous driving.

If the acceleration Ax is within the stop range, the travel recording module 51 determines that the automobile 200 has stopped (Yes at step S111). In this case, the travel recording module 51 creates accident moving-imagery data 62 and transmits it to the server 4 (step S112).

More specifically, the travel recording module 51 designates an accident period based on the time at which the acceleration Ax within the accident reference range was measured (i.e. accident occurrence time). The accident period may be the period starting 15 seconds before the accident occurrence time and ending 15 seconds after the accident occurrence time, for example. The travel recording module 51 extracts captured moving-imagery data 60 associated with the designated accident period from the captured moving-imagery data 60 recorded in the non-volatile memory 16 to create accident moving-imagery data 62. The travel recording module 51 immediately transmits the created accident moving-imagery data 62 to the server 4 regardless of whether there has been a request for video transmission from the server 4. Thereafter, the travel recording module 51 returns to step S108.

[5.2 Process by Regular Transmission Module 52]

Figure 9:
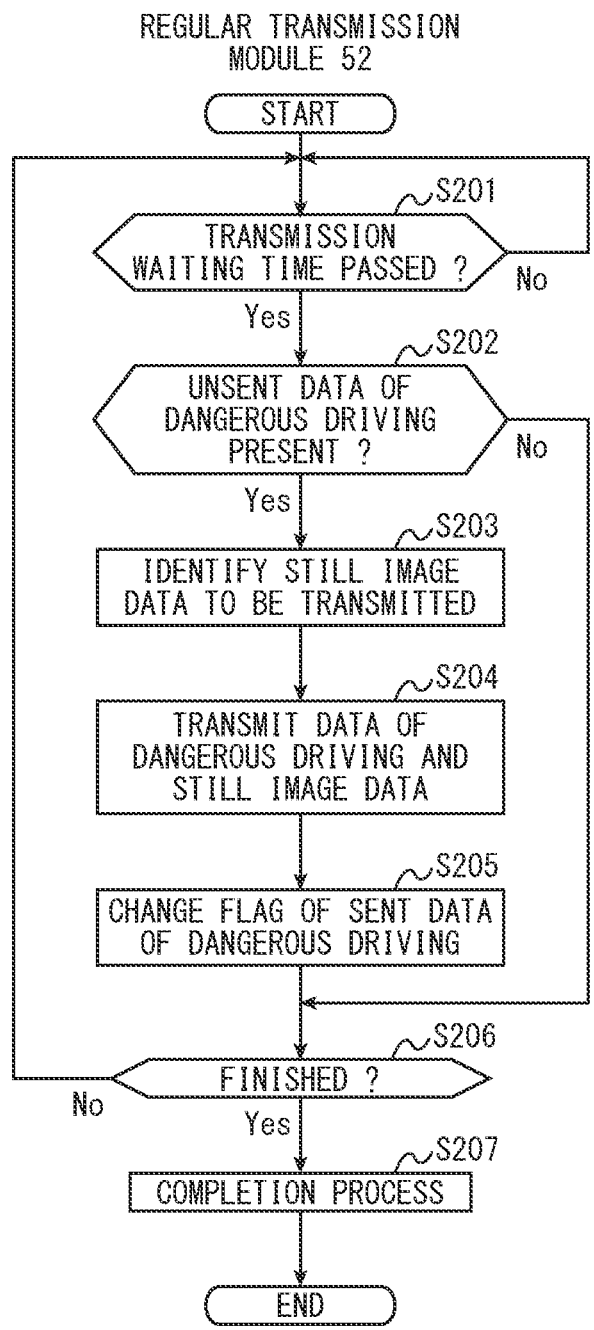
FIG. 9 is a flow chart for the regular transmission module shown in FIG. 2.

FIG. 9 is a flow chart of the operation of the regular transmission module 52 shown in FIG. 2. The regular transmission module 52 initiates the process shown in FIG. 9 as the driver of the automobile 200 instructs the drive recorder to initiate travel recording.

Referring to FIG. 9, the regular transmission module 52 determines whether a transmission waiting time has passed (step S201). The transmission waiting time has been set in advance in the regular transmission module 52, and indicates the interval at which data of dangerous driving 72 is transmitted to the server 4. The transmission waiting time may be 30 minutes, for example.

When the transmission waiting time has passed (Yes at step S201), the regular transmission module 52 refers to the data of dangerous driving 72 to determine whether there is an unsent record (step S202). If there is no unsent record (No at step S202), the regular transmission module 52 proceeds to step S206.

A situation where the data of dangerous driving 72 shown in FIG. 8 is stored in the non-volatile memory 16 at the time point at which the transmission waiting time passes will be described as an example. Referring to FIG. 8, since the transmission flags of the records 72C to 72E show "0", which indicates that they have not been sent to the server 4, the regular transmission module 52 determines that the records 72C to 72E have not been sent to the server 4 (Yes at step S202).

The regular transmission module 52 determines that records 72C to 72E should be transmitted, and identifies the sets of still image data 63 that are to be sent to the server 4 together with the records 72C to 72E (step S203). The regular transmission module 52 identifies three sets of the still image data 63 based on the still image paths registered in the records 72C to 72E.

The regular transmission module 52 transmits the records 72C to 72E and the three sets of still image data 63 identified at step S203 to the server 4 (step S204). At step S204, not all the data recorded in the records 72C to 72E need to be transmitted to the server 4. Of the data recorded in the records 72C to 72E, only the device ID, time point, position and acceleration need to be transmitted to the server 4.

Step S204 corresponds to step S2 shown in FIG. 5. Referring to FIG. 5, the server 4 records, in the vehicle administration data 40, the records 72C to 72E transmitted from the drive recorder 1 (step S3). Vehicle administration data 40 is available for each drive recorder. Based on the device IDs of the records 72C to 72E that have been transmitted, the server 4 identifies the vehicle administration data 40 in which the records should be recorded. The vehicle administration data 40 includes the same data as the data of dangerous driving 72 except transmission flag. The server 4 registers the data contained in the transmitted records 72C to 72E in the identified vehicle administration data 40.

Returning to FIG. 9, the regular transmission module 52 changes the transmission flags of the records 72C to 72E transmitted to the server 4 to "1", indicating that they have already been transmitted (step S205). Thereafter, the regular transmission module 52 proceeds to step S206.

At step S206, the regular transmission module 52 determines whether the drive recorder has been instructed to terminate travel recording. If it has not be instructed to do so (No at step S206), the regular transmission module 52 returns to step S201. If it has been instructed to do so (Yes at step S206), the regular transmission module 52 performs termination (step S207). The termination is the same process as steps S203 to S205 discussed above. Thus, when the drive recorder is instructed to terminate travel recording, the records and still image data 63 in the data of dangerous driving 72 that have not been transmitted to the server 4 are transmitted to the server 4. Thereafter, the regular transmission module 52 terminates the process shown in FIG. 9.

[5.3 Process by Response Module 53]

Figure 10:
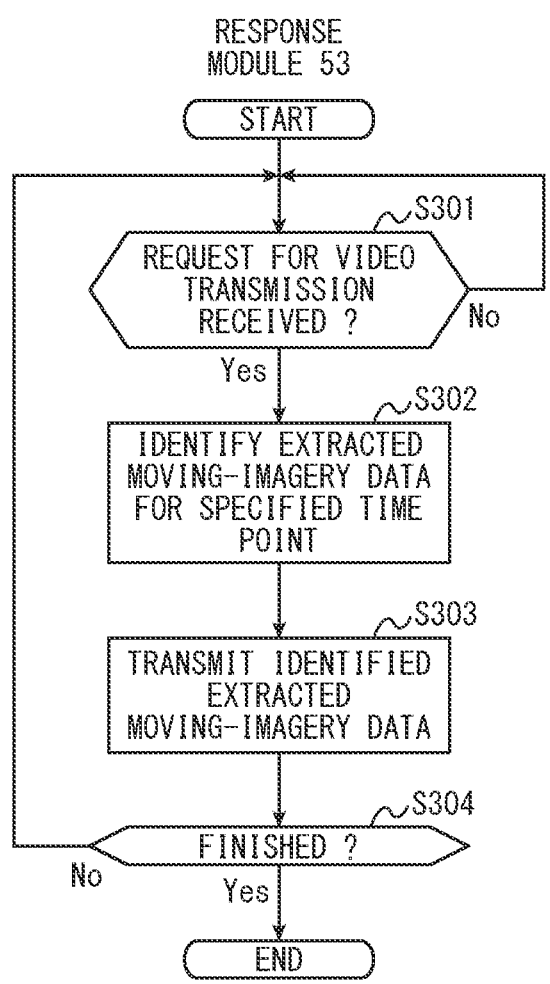
FIG. 10 is a flow chart for the response module shown in FIG. 2.

FIG. 10 is a flow chart of the operation of the response module 53 shown in FIG. 2. The response module 53 performs the process shown in FIG. 10 as long as the drive recorder 1 is powered on. Referring to FIG. 10, the response module 53 determines whether it has received a request for video transmission from the server 4 (step S301).

A request for video transmission is transmitted from the server 4 to the drive recorder 1 in the following way: The operation administrator operates the server 4 to view the vehicle administration data 40 for the drive recorder 1 to determine the travel conditions of the automobile 200. In response to an operation by the operation administrator, the server 4 selects at least one time point of dangerous driving from the vehicle administration data 40. The server 4 creates a request for video transmission containing the at least one time point of dangerous driving that has been selected, and transmits it to the drive recorder 1.

The server 4 may statistically process the time points of dangerous driving that have been recorded in the vehicle administration data 40 for the drive recorder 1 and present the results to the operation administrator. For example, the server 4 may count the number of time points of dangerous driving per hour and create a graph indicating how the counted number of time points of dangerous driving changes over time. The operation administrator refers to the graph and instruct the server to select time points of dangerous driving in a time range with a large counted number.

When the response module 53 has received a request for video transmission (Yes at step S301), it identifies a set of extracted moving-imagery data 61 to be transmitted, based on the time point of dangerous driving contained in the request for video transmission (step S302).

More specifically, the response module 53 refers to the data of dangerous driving 72 to select the record associated with the time point of dangerous driving contained in the request for video transmission. Referring to FIG. 8, if the time point of dangerous driving contained in the request for video transmission is "2015/4/10 9:31:49", the response module 53 selects the record 72C. Based on the extracted moving-imagery path recorded in the selected record 72C, the response module 53 identifies a set of extracted moving-imagery data 61 to be transmitted to the server 4. If the request for video transmission contains two or more time points of dangerous driving, those sets of extracted moving-imagery data 61 which correspond to the time points of dangerous driving are identified.

The response module 53 transmits to the server 4 the set of extracted moving-imagery data identified at step S302 (step S303). The process of step S303 corresponds to the process of step S6 shown in FIG. 5. The server 4 replays the extracted moving-imagery data 61 transmitted by the drive recorder 1. Thus, the operation administrator can check the travel conditions of the automobile 200 that were found at the time point of dangerous driving selected by the server 4.

Thereafter, if the drive recorder has not been instructed to terminate the process shown in FIG. 10 (No at step S304), the response module 53 returns to step S301. If it has been instructed to do so (Yes at step S304), the response module 53 terminates the process shown in FIG. 10.

Thus, when an acceleration Ax within an abnormality range is measured which suggests that dangerous driving has occurred, the drive recorder 1 notifies the server 4 of the time point of dangerous driving at which the acceleration Ax within the abnormality range was measured. When the drive recorder 1 receives a request for video transmission, it transmits to the server 4 extracted moving-imagery data 61 associated with a predetermined time period including the time point of dangerous driving designated by the request for video transmission. Thus, the server 4 can acquire captured moving-imagery data captured at any desired time point of dangerous driving selected from among the time points of dangerous driving of which it was notified by the drive recorder 1. Extracted moving-imagery data 61 is not transmitted to the server 4 each time an acceleration Ax within the abnormality range is measured, thereby reducing the amount of transmission.

If the only trigger for the drive recorder 1 to transmit data of moving imagery to the server 4 is a request for video transmission from the server 4, the server 4 may not acquire moving-imagery data captured upon a traffic accident. For example, if a fire erupts in the vehicle upon a traffic accident and the drive recorder 1 burns down, the data in the non-volatile memory 16 is lost. However, if the drive recorder 1 detects a traffic accident, it immediately transmits accident moving-imagery data 62 to the server 4, thereby preventing data captured upon a traffic accident from being lost.

The above-illustrated embodiment describes an implementation where the drive recorder 1 transmits data of dangerous driving 72 at a predetermined transmission interval; however, the invention is not limited to such an implementation. The drive recorder 1 may transmit data of dangerous driving 72 each time an acceleration Ax within an abnormality range is detected. More specifically, when an acceleration Ax within the abnormality range has been measured, the drive recorder 1 transmits the time point of dangerous driving, position and acceleration found when the acceleration Ax within the abnormality range was measured, in the form of data of dangerous driving 72. In this case, if the drive recorder 1 holds the extracted moving-imagery path corresponding to the time point of dangerous driving, the data of dangerous driving 72 shown in FIG. 8 need not be stored in the non-volatile memory 16. That is, the drive recorder 1 is only required to transmit data of dangerous driving 72 to the server 4 at a predetermined time point.

Further, the above-illustrated embodiment describes an implementation where the drive recorder 1 only uses the acceleration Ax; however, the invention is not limited to such an implementation. In addition to the acceleration Ax, the drive recorder 1 may use the accelerations Ay and Az. For example, the drive recorder 1 may determine whether the average of the accelerations Ax, Ay and Az is within an abnormality range. Such an implementation provides an abnormality range depending on average acceleration. Alternatively, the drive recorder 1 may determine whether at least one of the accelerations Ax, Ay and Az is within the abnormality range. Such an implementation provides abnormality ranges each depending on the corresponding one of the accelerations Ax, Ay and Az.

Furthermore, the above-illustrated embodiment describes an implementation where the drive recorder 1 transmits still image data 63 together with data of dangerous driving 72; however, the invention is not limited to such an implementation. The drive recorder 1 need not transmit still image data 63 when transmitting data of dangerous driving 72. This will further reduce the amount of transmission.

Further, the above-illustrated embodiment describes an implementation where the drive recorder 1 creates extracted moving-imagery data 61 each time an acceleration Ax within the abnormality range is measured; however, the invention is not limited to such an implementation. The drive recorder 1 may, upon reception of a request for video transmission, create extracted moving-imagery data 61 associated with the time point of dangerous driving contained in the request for video transmission.

Furthermore, the above-illustrated embodiment describes an implementation where the drive recorder 1 includes an acceleration sensor 19; however, the invention is not limited to such an implementation. For example, the drive recorder 1 may use an electronic compass or gyroscope sensor to measure the strength of an impact applied to the drive recorder 1. Alternatively, an electronic compass or gyroscope sensor may be used together with an acceleration sensor 19. That is, the drive recorder 1 is only required to include a sensor for measuring the strength of an impact applied to the drive recorder 1.

If a gyroscope sensor is used, the angular velocity measured by the gyroscope sensor is used to represent the strength of the impact applied to the drive recorder 1. If the gyroscope sensor is capable of measuring angular velocities in three axial directions, the abnormality range, accident reference range and stop range are defined by rotational angular velocities in the directions of the yaw axis (i.e. axis in the left-right direction), pitch axis (i.e. axis in the top-bottom direction) and roll axis (i.e. axis in the front-rear direction).

If an electronic compass is used, the amount of change in the direction of advance of the drive recorder 1 per unit time, as indicated by the electronic compass, is used to represent the strength of the impact. The amount of change obtained by using an electronic compass corresponds to the angular velocity around the yaw axis. Accordingly, if an electronic compass is used, it is desirable that an acceleration sensor 19 is also used to measure the strength, as measured along the front-rear direction, of an impact applied to the drive recorder 1.

Further, the above-illustrated embodiment describes an implementation where the mobile router 2 supports a mobile-phone communication system for communications over middle to long distances and a wireless LAN for communications over short distances; however, the invention is not limited to such an implementation. Instead of a mobile-phone communication system, the mobile router 2 may support other wireless communication specifications for middle to long distances (for example, Worldwide Interoperability for Microwave Access (Wimax)). Alternatively, instead of a wireless LAN, the mobile router 2 may support other wireless communication specifications for communications over short distances (for example, Bluetooth).

The above-illustrated embodiment describes an implementation where the recorder program 50 is installed on the drive recorder 1. The installation of the recorder program 50 is not limited to a particular method. For example, the recorder program 50 may be downloaded from a server connected to the network, and installed onto the drive recorder 1. Alternatively, if a computer-readable medium having the recorder program 50 recorded therein (for example, optical disk, universal serial bus (USB) memory, flexible disk, etc.), has been distributed, the recorder program 50 may be installed onto the drive recorder 1 from that medium.

Although embodiments of the present invention have been described, the above-illustrated embodiments are merely examples for carrying out the present invention. Thus, the present invention is not limited to the above-illustrated embodiments, and the above-illustrated embodiments may be modified as appropriate without departing from the spirit of the invention.

EXPLANATION OF CHARACTERS

1: drive recorder
4: server
17: GPS receiver
18: camera
19: acceleration sensor
48: server program
50: recorder program
51: travel recording module
52: regular transmission module
53: response module
60: captured moving-imagery data
61: extracted moving-imagery data
62: accident moving-imagery data
63: still image data
71: travel record data
72: data of dangerous driving

The invention claimed is:

1. A drive recorder comprising:
a non-transitory computer readable medium configured to record captured moving-imagery data captured by a camera installed on a vehicle;
a sensor configured to measure a strength of an impact applied to the drive recorder;
a processor configured to:

determine when the strength of the measured impact is within a predetermined abnormality range;

when the processor determines that the strength of the measured impact is within the abnormality range, record data of dangerous driving including a time point of dangerous driving at which the strength of the measured impact was determined to be within the abnormality range;

transmit to a server at a predetermined time interval the recorded time point of dangerous driving;

when receiving from the server a request for video transmission containing the transmitted time point of dangerous driving, transmit to the server, captured moving-imagery data including the requested time point of dangerous driving, wherein the captured moving imagery data is included in the recorded captured moving-imagery data;

determine when the measured strength of the impact is within a predetermined accident reference range that is larger than the abnormality range; and a transmitter configured to:
when the processor determines that the measured strength of the impact is within the accident reference range, transmit to the server, without waiting for the request for video transmission, out of the recorded captured moving-imagery data, captured moving-imagery data associated with a predetermined time period including a time point at which the measured strength of the impact was within the accident reference range.

2. The drive recorder according to claim 1, wherein:
when the processor determines that the strength of the measured impact is within the abnormality range, the processor creates a still image associated with the time point of dangerous driving based on an image captured by the camera, and the transmitter transmits the created still image together with the time point of dangerous driving.

3. The drive recorder according to claim 1, wherein:
when the processor determines that the strength of the measured impact is within the abnormality range, the processor extracts the captured moving-imagery data associated with the predetermined time period including the time point of dangerous driving from the recorded captured moving-imagery data, and the transmitter transmits the extracted captured moving-imagery data.

4. A vehicle administration system comprising:
a drive recorder installed on a vehicle; and
a server configured to communicate with the drive recorder over a network,
the drive recorder including:
a non-transitory computer readable medium configured to record captured moving-imagery data captured by a camera installed on the vehicle;
a sensor configured to measure a strength of an impact applied to the drive recorder;
a processor configured to:
determine when the strength of the measured impact is within a predetermined abnormality range;
when the processor determines that the strength of the measured impact is within the abnormality range, record data of dangerous driving including a time point of dangerous driving at which the strength of the measured impact was determined to be within the abnormality range;

transmit to a server at a predetermined time interval the recorded time point of dangerous driving;

when receiving from the server a request for video transmission containing the transmitted time point of dangerous driving, to transmit to the server, captured moving-imagery data including the requested time point of dangerous driving, wherein the captured moving imagery data is included in the recorded captured moving-imagery data;

determine when the measured strength of the impact is within a predetermined accident reference range that is larger than the abnormality range; and a transmitter configured to:
when the processor determines that the measured strength of the impact is within the accident reference range, transmit to the server, without waiting for the request for video transmission, out of the recorded captured moving-imagery data, captured moving-imagery data associated with a predetermined time period including a time point at which the measured strength of the impact was within the accident reference range, the server including:
a server processor configured to:
register, in vehicle administration data, the time point of dangerous driving of which the server has been notified by the drive recorder;
select at least one time point of dangerous driving registered in the vehicle administration data; and
a server transmitter configured to transmit, to the drive recorder, the request for video transmission containing the selected time point of dangerous driving.

5. The vehicle administration system according to claim 4, wherein, when the processor of the drive recorder determines that the measured strength of the impact is within the abnormality range, the processor creates a still image associated with the time point of dangerous driving based on an image captured by the camera, and the transmitter transmits the created still image together with the time point of dangerous driving.

6. The vehicle administration system according to claim 4, wherein:
when the processor of the drive recorder determines that the measured strength of the impact is within the abnormality range, the processor extracts the captured moving-imagery data associated with the predetermined time period including the time point of dangerous driving from the recorded captured moving-imagery data, and the transmitter transmits the extracted captured moving-imagery data.

7. A non-transitory computer-readable medium storing a program for causing a computer mounted on a drive recorder to perform the steps of:
recording captured moving-imagery data captured by a camera installed on a vehicle;
measuring a strength of an impact applied to the drive recorder by a sensor;
determining when the strength of the measured impact is within a predetermined abnormality range;
when it is determined that the strength of the measured impact is within the abnormality range, recording data of dangerous driving including a time point of dangerous driving at which the strength of the measured impact was determined to be within the abnormality range;

transmitting to a server at a predetermined time interval of the recorded time point of dangerous driving;

when receiving from the server a request for video transmission containing the transmitted time point of dangerous driving, transmitting to the server, captured moving-imagery data including the requested time point of dangerous driving, wherein the captured moving imagery data is included in the recorded captured moving-imagery data;

determining when the measured strength of the impact is within a predetermined accident reference range that is larger than the abnormality range; and when it is determined that the strength of the measured impact is within the accident reference range, transmitting to the server, without waiting for the request for video transmission, out of the recorded captured moving-imagery data, captured moving-imagery data associated with a predetermined time period including a time point at which the measured strength of the impact was within the accident reference range.

8. The non-transitory computer-readable medium storing a program according to claim 7, further causing the computer to perform the steps of:

when it is determined that the strength of the measured impact is within the abnormality range, creating a still image associated with the time point of dangerous driving based on an image captured by the camera, and transmitting the created still image together with the time point of dangerous driving.

9. The non-transitory computer-readable medium storing a program according to claim 7, further causing the computer to perform the steps of:

when it is determined that the strength of the measured impact is within the abnormality range, extracting the captured moving-imagery data associated with the predetermined time period including the time point of dangerous driving from the recorded captured moving-imagery data, and transmitting the extracted captured moving-imagery data.

* * * * *